United States Patent [19]
Hardt et al.

[11] 3,968,184
[45] July 6, 1976

[54] IMPACT-RESISTANT POLYVINYL CHLORIDE GRAFTED ETHYLENE-VINYL ESTERS

[75] Inventors: Dietrich Hardt; Heinrich Alberts, both of Cologne; Herbert Bartl, Odenthal-Hahnenberg, all of Germany

[73] Assignee: Bayer Aktiengesellschaft, Germany

[22] Filed: Apr. 2, 1974

[21] Appl. No.: 457,259

[30] Foreign Application Priority Data
Apr. 7, 1973 Germany.............................. 2317652

[52] U.S. Cl. .......................... 260/876 R; 260/2.5 R; 260/2.5 E; 260/2.5 FP; 260/2.5 H; 260/2.5 HA; 260/2.5 HB; 260/881; 260/884; 260/886
[51] Int. Cl.² ...................... C08J 9/16; C08L 51/06; C08L 33/18; C08L 27/06
[58] Field of Search ................................. 260/876 R

[56] References Cited
UNITED STATES PATENTS

| | | | |
|---|---|---|---|
| 3,432,576 | 3/1969 | Beer..................................... | 260/878 |
| 3,517,083 | 6/1970 | Slayer................................. | 260/878 |
| 3,742,090 | 6/1973 | Kuchi et al...................... | 260/876 R |
| 3,773,699 | 11/1973 | Bergmeister et al................ | 260/878 |
| 3,855,353 | 12/1974 | Alberts et al. .................. | 260/878 R |

*Primary Examiner*—Murray Tillman
*Assistant Examiner*—Thurman K. Page
*Attorney, Agent, or Firm*—Connolly and Hutz

[57] ABSTRACT

Moulding compounds with improved impact strength and weather resistance comprising mixtures of polyvinylchloride and graft polymers prepared from ethylene/vinyl ester copolymers on which have been grafted units of monomer mixtures of aromatic vinyl compounds, (meth)acrylonitrile and aliphatic monoolefins.

13 Claims, No Drawings

IMPACT-RESISTANT POLYVINYL CHLORIDE GRAFTED ETHYLENE-VINYL ESTERS

This invention relates to moulding compounds comprising mixtures of polyvinyl chloride (PVC) and graft polymers which have been prepared from ethylene/vinyl ester copolymers (graft substrate) on which have been grafted units of monomer mixtures of aromatic vinyl compounds, (meth)acrylonitrile and preferably also aliphatic monoolefins.

It is known to prepare PVC moulding compounds which have high impact strength and notched impact strength by mixing polyvinyl chloride with polymers which have rubbery elastic properties or which, by virtue of containing an elastomer component, are capable of elasticising PVC. By adding this elasticising component it is possible not only to adjust the degree of elasticity of the PVC according to the quantity added but also to improve numerous other properties of the PVC according to the type and quantity of additive used. The polymer mixtures obtained in this way have good mechanical properties as well as flame-resistance.

Impact-resistance PVC can be produced in this way by mixing PVC with minor quantities of polybutadiene or butadiene copolymers (see Belgian Patent Specification No. 629,046), chlorinated polyethylene (see U.S. Pat. No. 3,268,623) or ethylene/vinyl ester copolymers (see U.S. Pat. No. 3,517,083). In the same way, graft polymers of polybutadiene on which styrene/acrylonitrile units have been grafted (see U.S. Pat. No. 2,802,809) or graft polymers of vinyl chloride on ethylene/vinyl ester copolymers (see British Patent Specification No. 1,027,710) are used as impact strength modifiers. ABS graft polymers, chlorinated polyethylene and ethylene-vinyl acetate/vinyl chloride graft polymers of particular commercial importance in the processing of PVC.

Although mixtures of PVC and ABS graft polymers can easily be processed and have excellent mechanical properties, they are completely unsuitable for outdoor use because of their poor age resistance and weathering resistance. Although impact-resistant PVC moulding compounds can be obtained by using chlorinated polyethylene as modifying compound, these compounds are difficult to process and do not have sufficient age resistance for all purposes.

The moulding compounds comprising mixtures of PVC and ethylene-vinyl acetate-vinyl chloride graft polymers are high-quality products which can be easily processed to mouldings of extremely high light resistance and age resistance. This system is, however, relatively sensitive to the conditions under which it is processed since its impact strength frequently fails to develop if the system is exposed to undue heat or friction or it may decrease under certain processing conditions.

It is also known that moulding compounds which can easily be processed and which have advantageous properties such as great toughness and high heat resistance are obtained by combining PVC with ABS graft polymers in approximately equal proportions. These products, however, are not sufficiently light-fast and resistance to weathering due to the butadiene content in the additive.

It is an object of this invention to provide PVC moulding compounds which have high flame resistance, flow easily and can be processed within a wide range of temperatures as well as having good mechanical properties such as impact strength notched impact strength, hardness, light fastness and weather resistance.

The problem was solved by mixing PVC with graft polymers of ethylene/vinyl ester copolymers (graft substrate) on which are grafted units of monomer mixtures of aromatic vinyl compounds, (meth)acrylonitrile and, preferably aliphatic monoolefins.

This invention therefore relates to thermoplastic moulding compounds comprising
A. 25 to 99 % by weight, preferably 55 to 99 % by weight of polyvinyl chloride and
B. 1 to 75 % by weight, preferably 1 to 45 % by weight of a graft copolymer of
  I. 10 to 70 % by weight, preferably 15 to 55 % by weight of an ethylene/vinyl ester copolymer consisting of 25 to 75 % by weight, preferably 35 to 55 % by weight of vinyl ester units, and
  II. 90 to 30 % by weight, preferably 45 to 85 % by weight of polymerised units of a monomer mixture of
    a. 15 to 85 % by weight, preferably 15 to 34.9 % by weight of (meth)acrylonitrile,
    b. 85 to 15 % by weight, preferably 65 to 84.9 % by weight of at least one aromatic vinyl compound and
    c. 0 to 20 % by weight, preferably 0.1 to 10 % by weight of at least one aliphatic monoolefin which contains 2 – 18 carbon atoms, the sum of the percentage contents of (a) to (c) being 100.

Preferred thermoplastic moulding compounds comprise
A. 55 to 99 % by weight of polyvinyl chloride and
B. 1 to 45 % by weight of a graft copolymer of
  I. 15 to 55 % by weight of an ethylene/vinyl acetate copolymer containing 35–55% by weight of vinyl acetate built into the molecule and
  II. 45 to 85 % by weight of polymerised units of a monomer mixture of
    a. 15 to 34.9% by weight of (meth)acrylonitrile,
    b. 65 to 84.9% by weight of styrene or α-methyl styrene and
    c. 0.1 to 10% by weight, preferably 0.1–5% by weight of at least one aliphatic monoolefin which contains 2 – 8 carbon atoms, preferably propylene, butene-1 or isobutylene.

Ordinary commercial polyvinyl chloride prepared by emulsion, suspension or solvent-free polymerisation which has a K-values of from 50 – 80 determined in cyclohexanone (1 % solution at 23°C) may be used for the mixtures according to the invention but copolymers of vinyl chloride and vinyl acetate, (meth)acrylic acid esters containing from 1 – 8 carbon atoms in the alcohol component, monoesters or diesters of maleic acid containing from 1 – 8 carbon atoms in the alcohol component or olefins containing from 2 – 4 carbon atoms may also be used. These vinyl chloride copolymers contain one or more of the given monomers in quantities of up to about 20 % by weight. Polyvinyl chloride is preferred.

The graft polymers of ethylene/vinyl ester copolymers with grafted units of an aromatic vinyl compound and (meth)acrylonitrile used according to the invention may be prepared by the process disclosed in British Pat. No. 917,499 or German Offenlegungsschriften No. 1,964,479 (= British patent specification 1,282,120) and 2,137,780 (= British patent specification 1,315,637).

The preferred graft polymers of ethylene/vinyl ester copolymers which contain grafted units of a mixture of aromatic vinyl compounds, (meth)acrylonitrile and α-olefins containing 2 – 18 carbon atoms may be prepared by the processes according to German Offenlegungsschrift No. 2,215,880 = US-patent application Ser. No. 344,544, now U.S. Pat. No. 3,855,353, or German patent application P 23 05 681.7.

The ethylene/vinyl ester copolymers contain 25 – 75 % by weight, preferably 35 – 55 % by weight of vinyl esters incorporated in the molecule.

The vinyl esters may be organic vinyl esters of saturated aliphatic, cycloaliphatic, monocarboxylic acids containing 1 – 18 carbon atoms or aromatic monocarboxylic acids containing 7 – 11 carbon atoms, any of which monocarboxylic acids may be substituted with halogen, in particular with chlorine. The following are mentioned as examples: vinyl formate; vinyl acetate; vinyl propionate; vinyl chloropropionate; vinyl butyrate; vinyl isobutyrate; vinyl caproate; vinyl laurate; vinyl myristate; vinyl stearate and vinyl benzoate. Vinyl acetate is preferred.

The ethylene/vinyl ester copolymers are prepared by known methods of high- or medium-pressure synthesis, optionally in solvents such as tert. butanol.

The graft polymers used for preparing the moulding compounds according to the invention are preferably those which have been prepared from ethylene/vinyl acetate copolymers which contain 25–75% by weight and in particular 35–55% by weight of vinyl acetate units built into the copolymer and which have Mooney viscosities [DIN 53 523, ML 4' (100°C)] of about 8-55. The η-values (intrinsic viscosity of the graft polymers used, determined in dimethylformamide at 25°C or in chlorobenzene at 120°C) lie within the range of 0.5 to 4.5 [100 ml/g].

Suitable aromatic vinyl compounds for grafting on the graft polymers are, for example, styrene, alkyl styrenes which are substituted in the nucleus and contain 1–5 carbon atoms in the alkyl group, such as 4-methyl styrene, α-methyl styrene, halogenated styrenes such as 4-chlorostyrene or mixtures thereof. Styrene is preferred.

The grafted monoolefines may contain 2–18 carbon atoms and preferably contain 2–8 carbon atoms.

The following are specific examples of monoolefines which may be used: Ethylene, propylene, butene-1, butene-2, isobutylene, 2-methylbutene-2, 3-methylbutene-1, diisobutylene, triisobutylene, pentene-1, 4-methyl-pentene-1, octadecene-1 and cyclopentene. Propylene, butene-1, isobutylene or mixtures thereof are preferred.

The graft polymers and PVC may, in principle, be combined in any proportions but it is preferred to use mixtures which contain 25–99% by weight, particularly 55–99% by weight of PVC, based on the total mixture.

The known PVC stabilisers may be added to the moulding compounds according to the invention, i.e. stabilising systems based on lead, barium/cadmium, calcium/zinc, organic tin compounds or organic stabilisers such as α-phenyl indol, diphenylthiourea, α-aminocrotonic acid esters and epoxydised fatty acid esters, either alone or in combination. The choice of necessary lubricants is also determined according to the ease with which the PVC can then be processed.

Physical or chemical blowing agents may also be added to the moulding compounds according to the invention in order to obtain a foam structure under suitable processing conditions.

Colour pigments, fillers, antistatic agents, flame-retarding agents, etc. may, in principle, also be added to achieve certain properties or effects.

The mixing or preparation of the mixtures according to the invention is carried out by the usual methods of PVC technology. The mixtures are prepared either in impeller mixers or on rollers, either using the dry starting components in the form of powder (dry-blend) or first preparing a granulate from them. Double screw extruders, planetary roller extruders or band granulators may be used for preparing the granulates.

The wide variety of possible methods of processing the prepared dry-blend or granulates are also in line with PVC technology. The mixtures may be extruded, calendered or processed by injection moulding. The method of extrusion blowing may also be employed. The compounds according to the invention may be processed at temperatures between 160° and 220°C. Compounds which have a comparatively low PVC content may be processed at higher temperatures than those which have a high PVC content.

The compounds according to the invention are thermoplastically deformable and may vary in their hardness, but are very tough materials which, owing to their mechanical properties, may be used as material for chemical apparatus. Among their particularly advantageous properties may be mentioned their great toughness even at low temperatures, their hardness, stiffness in flexure and light-fastness and age resistance. Added to these qualities is the ease with which the compounds can be processed, even over wide temperature ranges. Examples I, III and V show the mechanical properties of moulding compounds according to the invention.

The reliability with which the compounds can be processed even over wide temperature ranges is clear when comparing the notched impact strength of example 1 with that of example 2 or of example 3 with that of example Impact-resistant Impact-resistance moulding compounds obtained according to the known art from PVC and graft polymers or vinyl chloride grafted on ethylene/vinyl acetate copolymers lose their high notched impact strength at processing temperatures above 170°C, as the examples show. The high values for notched impact strengths obtained in the preferred compounds according to the invention, on the other hand, persist even at a roller and pressing temperature of 180°C. This is an important advantage for the processing of the product.

If ethylene/vinyl acetate copolymers with a high vinyl ester content are used for preparing the graft polymers in the mixtures according to the invention then, although the moulding compounds obtained according to the invention are very hard and have a high flexural and impact strength, their notched impact strength is low (example 6). Mixtures of this kind cannot be used for the production of moulded products which are required to have a high notched impact strength, but they are suitable for the production of sheets and coatings.

The excellent light-fastness and weather resistance of the moulding compounds according to the invention are clearly seen when the compounds are tested by the fadeometer and weatherometer test. As described in example 7, samples which are pigmented white can withstand 1000 hours exposure to light in the fadeometer and 4000 hours in the weatherometer test without showing any discolouration. Because of these properties, the products are eminently suitable for use as constructional materials, especially for outdoor use.

The moulding compounds according to the invention are primarily used for producing sections, extruded boards and injection-moulded articles. The sections are found to be useful mainly in the building and furniture industries, for example, as window sections, door frames, balcony facings, roof gutters, road signposts, stairtread edges, curtain rails, fence boards, bench sections, various types of pipes, partition sections and partition elements and deepdrawn boards for wall panelling. Injection moulding may be employed, e.g. for producing domestic and utility goods, spare parts for the motorcar industry, cases for typewriters and electrical instruments and furniture and furniture parts. Calendered sheetings may be used in the packaging industry, for example, or specially coloured and patterned sheetings may be used as veneers and coverings in the furniture industry. Impact-resistant bottles can be produced by extrusion blowing.

Apart from the various uses mentioned above, the materials according to the invention may be employed wherever tough, lightfast and flame-resistance thermoplastic materials are required.

Preparation of the graft polymers used as starting materials:

GRAFT POLYMER A ACCORDING TO TABLE 1 AND EXAMPLE 1

16 liters of tert. butanol, 6 kg of an ethylene/vinyl acetate copolymer which has a vinyl acetate content of 45% by weight, 5 kg of styrene and 1.85 kg of acrylonitrile are introduced into a 40-liter stirrer autoclave under a nitrogen atmosphere. The autoclave is evacuated and flushed out with nitrogen. 0.5 kg of propylene are then introduced. The contents of the autoclave are heated to 80°C and stirred for 2 hours at 80°C and 4 atm. pressure. Half of a solution of 20 g of tert. butyl peroctoate in 400 ml of tert. butanol is added at this stage and the remainder is added after 3 hours. The reaction mixture is then stirred for 3 hours at 80°C, 1 hour at 100°C and 6 atm. pressure and 3 hours at 120°C and 7.8 atm. pressure. Steam is then passed through the resulting suspension polymer to drive out the solvent and residual monomers. 12.7 kg of a graft copolymer having the composition shown in table 1 are obtained after drying.

The ethylene/vinyl acetate graft polymers used in the other examples, which are grafted with units of a mixture of styrene, acrylonitrile and α-olefines, were prepared in a similar manner.

GRAFT POLYMER B ACCORDING TO TABLE 1 AND EXAMPLE 5

150 g of an ethylene/vinyl acetate copolymer containing 45% by weight of vinyl acetate are dissolved in 112 g of styrene and 38 g of acrylonitrile at 60°C under nitrogen. 3 g of a graft polymer of styrene on polyethylene oxide, 57 g of an 8% solution of a 1 : 1 copolymer of methyl methacrylate and the sodium salt of methacrylic acid, 700 g of water and 0.3 g of benzoyl peroxide are then added and the reaction mixture is stirred for 1 hour at 80°C. 130 g of isobutylene are introduced during this time. A solution in 700 g of water of 2 g of sodium alkyl sulphonate containing 12–14 carbon atoms in the alkyl chain is then added over a period of 30 minutes. The reaction mixture is then stirred for a further 5 hours at 80°C. When the reaction mixture has been processed, 215 g of a graft copolymer which has the composition shown in table 1 are obtained.

GRAFT POLYMER C ACCORDING TO TABLE 1 AND EXAMPLE 3

400 g of an ethylene/vinyl acetate copolymer containing 30% by weight of vinyl acetate units are dissolved in 666 g of styrene under an atmosphere of nitrogen at 80°C. 210 g of acrylonitrile and 55 ml of an 80% solution of dispersing agent (see B) are then added. The introduction of isobutylene is then begun. The reaction mixture is stirred for 15 minutes at 80°C and 100 ml of water containing 0.4 g of sodium pyrosulphite are then added. After 15 minutes at 80°C, a solution of 1.65 tert. butyl perpivalate in 15 ml of a petroleum hydrocarbon fraction (bp. 100°C – 140°C) are added. 1060 ml of a 0.3% polyvinyl alcohol solution containing 6 g of sodium hydrogen phosphate are then added over a period of 2 hours. 180 g of isobutylene are passed through the reaction mixture during this time. The mixture is then stirred for a further 2 hours at 80°C and the bead polymer is processed. 1213 g of a graft copolymer which has the composition shown in table 1 are obtained.

GRAFT POLYMERS E AND F ACCORDING TO TABLE 1 AND EXAMPLE 2 (COMPARISON)

The graft polymer described was prepared under the conditions described in British Patent Specification No. 1,021,324.

EXAMPLES 1 – 6

Graft polymers of various compositions (Table 1, A-F) are homogenised for 10 minutes with a PVC suspension which has a K-value of 68 and 1.5 parts by weight of a dibutyl tin dimercaptide as heat stabiliser for PVC at 170 and 180°C. The rolled sheets are then pressed for 7 minutes at the same temperatures to form boards which are used for the mechanical tests.

TABLE 1

| Composition and properties of the graft polymer | Dimension | A | B | C | D | E | F |
|---|---|---|---|---|---|---|---|
| Ethylene/vinyl acetate copolymer (EVA) | % by weight | 48 | 64.4 | 33 | 50.5 | 50 | 33 |
| Vinyl acetate content (VA) in the EVA | % by weight | 45 | 45 | 30 | 70 | 44 | 30 |
| Mooney viscosity of the EVA [ML 4'(100°C) DIN 53 523 ] | | 22 | 18 | 15 | 11.0 | 21 | 10 |

TABLE 1-continued

| Composition and properties of the graft polymer | Dimension | A | B | C | D | E | F |
|---|---|---|---|---|---|---|---|
| Grafted units: | | | | | | | |
| Styrene | % by weight | 35.2 | 28.1 | 46.9 | 37.1 | — | — |
| Acrylonitrile | % by weight | 16 | 5.7 | 17 | 12.4 | — | — |
| Vinyl chloride | % by weight | — | — | — | — | 50 | 67 |
| Propylene | % by weight | 0.8 | — | — | — | — | — |
| Isobutylene | % by weight | — | 1.8 | 3.1 | — | — | — |
| η-value of the graft polymer (25°C, determined in dimethylformamide) | $\frac{100\ ml}{g}$ | 0.95 | 0.82 | 1.42 | 1.02 | — | — |
| K-value of the graft polymer (25°C, determined in cyclohexanone) | *) | — | — | — | — | 78 | 71 |

*) K-value: See H.Fickentscher, Cellulosechemie 13 (1932) page 58.

COMPOSITION OF THE MOULDING COMPOUNDS IN EXAMPLES 1 – 6

1. 83.3 parts by weight of PVC (according to the invention) 16.7 parts by weight of graft polymer A
2. 84 parts by weight of PVC (comparison) 16 parts by weight of graft polymer E
3. 69.7 parts by weight of PVC (according to the invention) 30.3 parts by weight of graft polymer C
4. 69.7 parts by weight of PVC (comparison) 30.3 parts by weight of graft polymer F
5. 87.6 parts by weight of PVC (according to the invention) 12.4 parts by weight of graft polymer B
6. 84.2 parts by weight of PVC (according to the invention) 15.8 parts by weight of graft polymer D The mechanical properties are shown in table 2 below.

TABLE 2

| | ball indentation hardness DIN 53456 kp/cm² 30″ | impact strength DIN 53453 cmkp/cm² 25°C | −20°C | notched DIN impact 53 453 strength cmkp/cm² 25°C | ±0°C | −20°C | heat distortion according to Vicat DIN 53460 °C | bending stress DIN 53 452 kp/cm² | tensile strength DIN 53455 kp/cm² | elongation DIN 53 455 % | processing temperature °C |
|---|---|---|---|---|---|---|---|---|---|---|---|
| 1. | 957 | x | (2/10)95 | 33 | 7 | 4 | 82 | 748 | 493 | 58 | 170 |
|    | 932 | x | x | 38 | 8 | 4 | 82 | 745 | 485 | 91 | 180 |
| 2. | 946 | x | x | 35 | 5 | — | 81 | 752 | 483 | 40 | 170 |
|    | 942 | x | x | 6 | 4 | — | 80 | 771 | 487 | 129 | 180 |
| 3. | 926 | (3/10)87 | x | 27 | 7 | 3 | 86 | 710 | 375 | 40 | 170 |
|    | 956 | x | x | 20 | 5 | 3 | 88 | 785 | 494 | 47 | 180 |
| 4. | 854 | x | x | 22 | 7 | 3 | 85 | 690 | 365 | 57 | 170 |
|    | 897 | x | x | 3 | 2 | — | 86 | 775 | 503 | 72 | 180 |
| 5. | 849 | x | x | 19 | 9 | 5 | 78 | 583 | 391 | 43 | 170 |
|    | 837 | x | x | 46 | 10 | 6 | 80 | 683 | 436 | 47 | 180 |
| 6. | 1211 | x/1/10 | (4/10)69 | 2 | — | — | 78 | 984 | — | — | 170 |
|    | 1264 | | (1/10)73 | 2 | — | — | 78 | 1210 | — | — | 180 | x = not broken $n/10 = \frac{\text{number of broken test samples}}{\text{number of test samples}}$ (2/10)95 = 2 of the test samples are broken, impact strength is 95 cm kp/cm², 8 of the test samples are not broken The η-values and Mooney viscosities given in the following examples were determined by the methods indicated in table 1.

EXAMPLE 7

A mixture of 83.3 parts by weight of suspension PVC which has a K-value of 68 and 16.7 parts by weight of a graft polymer ([η] = 0.95 (100 ml/g)) consisting of 48 % by weight of EVA which has a vinyl acetate content of 45% by weight (Mooney) viscosity 18) on which are grafted monomer units consisting of 36.5 % by weight of styrene,
14.0 % by weight of acrylonitrile and
2.5 % by weight of propylene to which has been added 2.5 parts by weight of titanium dioxide and a stabiliser/lubricant system of the following composition 2 parts by weight of Ba/Cd fatty acid complex (mark WSX (R) product of Argus),
1 part by weight of epoxydised soya bean oil,
0.6 parts by weight of triphenyl phosphite,
0.8 parts by weight of Loxiol G 60 (R) (trade product of Henkel),
0.4 parts by weight of OP wax (R) (trade product of Höchst) and
0.2 parts by weight of PA-520 (R) (trade product of Höchst)

is rolled for 10 minutes at 170°C and then pressed at the same temperature for 7 minutes to form boards 4 mm in thickness. Test samples cut from these boards are tested for their age resistance as follows:

a. Atlas fadeometer
  conditions: carbon arc lamp black-panel-temperature 50° – 55°C relative atmospheric humidity 18 – 20%.

The white test samples showed no difference from the control sample after 1000 hours' exposure to the light. A comparison product based on PVC/ABS graft polymer discolours after a short time.

b. Weatherometer
conditions: carbon arc lamp. Rotary sample drum and spraying assembly.
Spraying cycle: 17 minutes exposure to light 3 minutes exposure to light and spraying
black-panel-temperature
before spraying 42°C,
after spraying 22°C.

The white test samples showed no signs of yellowing or discolouration after 4000 hours' exposure to the light. The thermoplastic mixtures according to the invention are therefore to be regarded as lightfast and suitable for outdoor use.

EXAMPLE 8

50 parts by weight of a PVC suspension which has a K-value of 68 and 50 parts by weight of a graft polymer of EVA on which a mixture of styrene/acrylonitrile/propylene has been grafted ($[\eta] = 1.8$ [100 ml/g]) are rolled with the addition of dibutyl tin dimercaptide as PVC stabiliser at 170°C to form a homogeneous sheet. The graft polymer consists of 17% by weight of an ethylene/vinyl acetate copolymer (vinyl acetate content 45% by weight, Mooney viscosity 16) on which 21% by weight of acrylonitrile, 60.5% by weight of styrene and 1.5 % by weight of propylene have been grafted as monomer units. The homogeneous rolled sheets are pressed for 5 minutes at 170°C to form boards. The product obtained is a thermoplastic moulding compound of great hardness and toughness and high dimensional stability under heat (table III).

EXAMPLE 9

25 parts by weight of a PVC suspension which has a K-value of 68 and 75 parts by weight of a graft polymer of EVA/styrene-acrylonitrile-propylene ($\eta$) = 1.8 [100 ml/g] are rolled at 170°C with the addition of dibutyl tin dimercaptide as PVC stabiliser to form a homogeneous sheet. The graft polymer consists of 17% by weight of an ethylene/vinyl acetate copolymer (vinyl acetate content 45% by weight, Mooney viscosity 19) on which 21% by weight of acrylonitrile, 61.5% by weight of styrene and 0.5% by weight of propylene have been grafted as monomer units. The homogeneous rolled sheets are pressed at 170°C for 5 minutes to form boards. The thermoplastic moulding compound is distinguished by its high softening point and great hardness as well as excellent toughness (table III).

EXAMPLE 10

60 parts by weight of a PVC suspension with has a K-value of 68 and 40 parts by weight of a graft polymer of EVA/styrene-acrylonitrile-propylen, ($\eta$) = 1.2 [100 ml/g] are processed on a roller with the addition of dibutyl tin dimercaptide as PVC stabiliser at 170°C and 180°C to form a homogeneous sheet in each case. The graft polymer consists of 26.4% by weight of an ethylene/vinyl acetate copolymer (vinyl acetate content 44%, Mooney viscosity 24) on which 18.3% by weight of acrylonitrile, 54.4% by weight of styrene and 0.8% by weight of isobutene have been grafted as monomer units. The homogeneous rolled sheets are pressed for 5 minutes at 170°C and 180°C, respectively, to form boards. The thermoplastic moulding compound is distinguished by its high softening point, great hardness and excellent toughness.

Table III

| Example | Ball indentation hardness DIN 53 456 kp/cm² 30" | Impact strength DIN 53 453 cm kp/cm² 25°C | Notched impact strength DIN 53 453 cm kp/cm² 25°C | heat distortion according to Vicat DIN 53 460 °C | Bending stress DIN 53 452 σbF kp/cm² | Processing temperature °C |
| --- | --- | --- | --- | --- | --- | --- |
| 8 | 1113 | x | 12 | 86 | 917 | 170 |
| 9 | 1025 | x | 14 | 90 | 852 | 170 | x = samples not broken

Table referring to example 10

| Example | Ball indentation hardness DIN 53 456 kp/cm² 30" | Impact strength DIN 53 453 cm kp/cm² 25°C | Notched impact strength DIN 53 453 cm kp/cm² 25°C | heat distortion according to Vicat DIN 53 460 °C | Bending stress DIN 53 452 σ bF kp/cm² | Processing temperature °C |
| --- | --- | --- | --- | --- | --- | --- |
| 10 | 989 | x | 24 | 86 | 835 | 170 |
|  | 1012 | x | 31 | 87 | 820 | 180 | x = samples not broken

We claim:
1. Thermoplastic moulding compounds consisting essentially of a mixture of
   A. 25–99% by weight of polyvinyl chloride and
   B. 1–75% by weight of a graft copolymer of
      I. 10–70% by weight of an ethylene/vinyl ester copolymer containing 25–75% by weight of vinyl ester units as grafting substrate and
      II. 90–30% by weight of grafted polymerized units of a monomer mixture of
         a. 15–85% by weight of acrylonitrile, methacrylonitrile or a mixture thereof,
         b. 85–15% by weight of at least one aromatic vinyl compound and
         c. 0.1–10% by weight of at least one aliphatic monoolefin having 2–18 carbon atoms,
   the sum of the percentage contents of (a) to (c) being 100.
2. Thermoplastic moulding compounds as claimed in claim 1, consisting essentially of from 55 to 99 % by weight of component (A) and from 1 to 45 % by weight of component (B).

3. Thermoplastic moulding compounds as claimed in claim 1, in which component (B) is a copolymer of from 15 to 55 % by weight of component (I) and from 45 to 85 % by weight of component (II).

4. Thermoplastic moulding compounds as claimed in claim 1, in which component (I) is an ethylene/vinyl ester copolymer containing from 35 to 55 % by weight of vinyl ester units.

5. Thermoplastic moulding compounds as claimed in claim 1, in which the grafted monomer mixture (II) consists essentially of
   a. from 15 to 34.9% by weight of acrylonitrile, methacrylonitrile or a mixture thereof,
   b. from 65 to 84.9% by weight of at least one aromatic vinyl compound and
   c. from 0.1 to 10% by weight of at least one aliphatic monoolefin having 2–18 carbon atoms, the sum of the percentage contents of (a) to (c) being 100.

6. Thermoplastic moulding compounds as claimed in claim 1, in which the monoolefin (c) has from 2 to 8 carbon atoms.

7. A thermoplastic moulding compound as claimed in claim 6, in which the monoolefin (c) is selected from the group consisting of propylene, butene-1 and isobutylene.

8. Thermoplastic moulding compounds as claimed in claim 1, in which the aromatic vinyl compound (b) is styrene or α-methyl styrene.

9. Thermoplastic moulding compounds as claimed in claim 1, in which the component (A) is polyvinyl chloride with a K-value of from 50 to 80, determined in a 1 % solution in cyclohexanone at 23°C.

10. Thermoplastic moulding compounds as claimed in claim 1, in which the ethylene/vinyl ester copolymer component (I) contains organic vinyl ester units of saturated aliphatic monocarboxylic or cycloaliphatic acids containing from 1 to 18 carbon atoms or of aromatic monocarboxylic acids containing from 7 to 11 carbon atoms, any of which acids may be substituted with halogen.

11. Thermoplastic moulding compounds as claimed in claim 10, in which the ethylene/vinyl ester copolymer contains vinyl acetate units.

12. Thermoplastic moulding compounds as claimed in claim 1, consisting essentially of
   A. 55 – 99 % by weight of polyvinyl chloride and
   B. 1 – 45 % by weight of a graft copolymer of
      I. 15 – 55 % by weight of an ethylene/vinyl acetate copolymer containing 35 – 55 % by weight of vinyl acetate units and
      II. 45 – 85 % by weight of polymerised units of a monomer mixture of
         a. 15 – 34.9 % by weight of methacrylonitrile, acrylonitrile or a mixture thereof,
         b. 65 – 84.9 % by weight of styrene α-methyl styrene or mixtures thereof, and
         c. 0.1 – 10 % by weight of at least one monoolefin having 2 – 8 carbon atoms.

13. A section, extruded board or injection-moulded article which consists essentially of a thermoplastic moulding compound as claimed in claim 1.

* * * * *